(12) United States Patent
Marupaduga (10) Patent No.: US 11,089,647 B1
(45) Date of Patent: Aug. 10, 2021

(54) USE OF UE POWER CLASS AND QUANTITY OF ACCESS-NODE RECEIVE ANTENNAS AS BASIS TO CONTROL CONFIGURATION OF DUAL-CONNECTIVITY SERVICE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/848,655

(22) Filed: Apr. 14, 2020

(51) Int. Cl.
*H04W 76/16* (2018.01)
*H04W 52/42* (2009.01)
*H04W 36/00* (2009.01)

(52) U.S. Cl.
CPC .......... *H04W 76/16* (2018.02); *H04W 52/42* (2013.01); *H04W 36/0069* (2018.08)

(58) Field of Classification Search
CPC .. H04W 76/16; H04W 52/42; H04W 36/0069
See application file for complete search history.

(56) References Cited

U.S. PATENT DOCUMENTS

| | | |
|---|---|---|
| 9,847,848 B2 | 12/2017 | Ryu et al. |
| 10,237,877 B1 | 3/2019 | Singh et al. |
| 10,623,070 B1 | 4/2020 | Marupaduga et al. |
| 2017/0055224 A1* | 2/2017 | Boccardi ............... H04W 28/08 |
| 2018/0255493 A1 | 9/2018 | Wu |
| 2020/0076518 A1* | 3/2020 | Patel .................... H04B 17/318 |
| 2020/0351643 A1* | 11/2020 | Dhanapal ............... H04W 8/24 |

* cited by examiner

*Primary Examiner* — Moo Jeong (57) ABSTRACT

A method and system for controlling configuration of dual-connectivity service for a user equipment device (UE), where the dual-connectivity service would involve the UE being served concurrently by a first access node over a first connection according to a first radio access technology (RAT) and by a second access node over a second connection according to a second RAT. An example method includes selecting the second access node to be used in the dual-connectivity service of the UE, with the selecting being based cooperatively on (i) a power class of the UE and (ii) a quantity of receive antennas of the second access node. And the example method further includes, based on the selecting, configuring the dual-connectivity service for the UE.

19 Claims, 5 Drawing Sheets

---

SELECT A SECOND ACCESS NODE TO BE USED IN DUAL-CONNECTIVITY SERVICE OF A UE, WITH THE SELECTING OF THE SECOND ACCESS NODE BEING BASED COOPERATIVELY ON (i) A POWER CLASS OF THE UE AND (ii) A QUANTITY OF RECEIVE ANTENNAS OF THE SECOND ACCESS NODE

40

BASED ON THE SELECTING, CONFIGURE THE DUAL-CONNECTIVITY SERVICE FOR THE UE

USE OF UE POWER CLASS AND QUANTITY OF ACCESS-NODE RECEIVE ANTENNAS AS BASIS TO CONTROL CONFIGURATION OF DUAL-CONNECTIVITY SERVICE

BACKGROUND

A cellular wireless network typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide a respective cell defined on a radio-frequency (RF) carrier, which could be frequency division duplex (FDD), with separate frequency channels for downlink and uplink communication, or time division duplex (TDD), with a single frequency channel multiplexed over time between downlink and uplink use. (In practice, an access node might provide multiple cells, each on a different respective carrier. But for simplicity, each cell in that scenario could be considered to be provided by a different respective access node.)

On the downlink and uplink channels, the air interface of each such cell could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served UEs.

In addition, certain resources on the downlink and/or uplink of each such cell could be reserved for special purposes.

On the downlink, for instance, certain resource elements in each downlink subframe could be generally reserved to define a downlink control channel for carrying control signaling such as PRB-allocation directives and the like to served UEs, and other resource elements in each downlink subframe could be generally reserved to define an uplink shared channel in which the PRBs noted above can be allocated to carry data from the access node to UEs. Further, certain resource elements in designated downlink subframes could be reserved to carry synchronization signals that UEs could detect as an indication of coverage, other resource elements distributed in a defined pattern throughout each downlink subframe could be reserved to carry a reference signal that UEs could measure in order to determine coverage strength.

And on the uplink, certain resource elements in each uplink subframe could be generally reserved to define an uplink control channel for carrying control signaling such as scheduling requests from UEs to the access node, and other resource elements in each uplink subframe could be generally reserved to define an uplink shared channel in which the PRBs noted above can be allocated to carry data from UEs to the access node. Further, certain resource elements on the uplink could be specially reserved to carry other uplink signals, such as random access signals, sounding reference signals, and the like.

Other air interface configurations are possible as well.

OVERVIEW

When a UE enters into coverage of an example network, the UE could detect threshold strong coverage of an access node in a particular (e.g., a threshold strong reference signal broadcast by the access node on that carrier of that cell) and could then engage in random-access and connection signaling, such as Radio Resource Control (RRC) signaling, to establish an air-interface connection (e.g., RRC connection) through which the access node will then serve the UE in that cell.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when packet-data arrives at the access node for transmission to the UE, the access node could schedule use of certain downlink PRBs in subframe to carry a transport-block of that data to the UE, the access node could transmit to the UE in the control region of that subframe a scheduling directive (e.g., a Downlink Control Information (DCI) message) that specifies the PRBs that will carry the data, and the access node could transmit the data to the UE in those PRBs. And when the UE has packet-data to transmit to the access node, the UE could transmit to the access node a scheduling request including a buffer status report (BSR) indicating the quantity of data to be transmitted, the access node could schedule use of certain uplink PRBs in an upcoming subframe to carry a transport-block of that data from the UE and could transmit to the UE an advanced scheduling directive that specifies those PRBs, and the UE could then transmit the data to the access node in those PRBs.

When an access node serves a UE, a key technical issue is how strong the access node's uplink receive signal strength from the UE is. Higher uplink receive signal strength from a UE may enable the access node to better distinguish between the UE's transmission and uplink noise and interference and may therefore facilitate higher uplink data rate. In an example implementation, for instance, higher receive signal strength from a UE may correlate with a higher signal to noise plus interference ratio (SINR) observed by the access node, which may result in the access node directing the UE to use a higher-order modulation and coding scheme, thereby enabling the UE to transmit more user-plane data to the access node per uplink PRB.

Particularly where a UE is distant from the access node, there are at least two factors that could impact the access node's uplink receive signal strength from the UE.

One factor is the UE's transmit power, and specifically the UE's maximum transmit power. In typical practice, when an access node serves a UE, the access node and UE may engage in a power control process through which the access node controls the power at which the UE engages in uplink transmission. This process could involve the access node regularly monitoring SINR of the UE's transmissions, comparing the SINR to a set point, and directing the UE to increment its transmit power if the SINR is below the set point or directing the UE to decrement its transmit power if the SINR is above the set point.

The UE's ability to increment its transmit power, however, could be limited by the UE's maximum transmit power, which could be established based on the UE's power class. Industry standards or governmental regulations define various UE power classes, and UEs could be characterized by their manufacturing specifications or other data to be a member of one power class or another. Without limitation, examples of such power classes include: (a) Power Class 1, defining a maximum transmit power of 21 decibel-milliwatts (dBm) (about 0.13 Watts), (b) Power Class 2, defining a maximum transmit power of 23 dBm (about 0.2 Watts), (c) Power Class 3, defining a maximum transmit power of 26 dBm (about 0.4 Watts), and (d) Power Class 4, defining a maximum transmit power of 31 dBm (about 1.26 Watts). Generally, a higher power class could thus allow a UE to transmit with higher power when necessary, and that higher transmit power could correlate with higher uplink receive signal strength and potentially higher uplink data rate.

Another factor that could impact the access node's uplink receive signal strength from the UE is the quantity of receive antennas (e.g., receive antenna-elements) that the access node uses for receiving the UE's transmission. In particular, if the access node uses a greater number of receive antennas for receiving the UE's transmission output at a given transmit power, the access node may have higher uplink antenna gain, which could correlate with higher receive signal strength. For instance, doubling the number of receive antennas used by the access node may likewise double the access node's receive antenna gain, which could significantly increase the access node's receive signal strength.

When the industry advances from one generation of wireless technology to the next, or in other scenarios, networks and UEs may also support dual-connectivity service, where a UE is served on co-existing connections according to multiple different RATs.

For instance, a cell site (or a combination of cell sites for that matter) could be equipped with a first access node that provides service according to a first RAT ("first-RAT access node") and a second access node that provides service according to a second RAT ("second-RAT access node"), and a UE positioned within coverage of the cell site could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, the first-RAT access node could operate as a master node (MN), responsible for coordinating setup and teardown of dual-connectivity service for the UE and functioning as an anchor point for RRC signaling and core-network control signaling related to the dual-connectivity service, and the second-RAT access node could function as a secondary node (SN), mainly to provide added connectivity and increased aggregate bandwidth for the UE.

When the UE enters into coverage of such a system, the UE could initially scan for and discover threshold strong coverage of the MN under the first RAT, and the UE could responsively engage in signaling as discussed above to establish a first-RAT air-interface connection between the UE and the MN. Further, the UE could engage in attach signaling with a core-network controller via the MN, and the core-network controller and MN could coordinate establishment for the UE of at least one bearer as discussed above.

The MN could then serve the UE in a standalone mode with packet-data communications in the manner described above. Further, perhaps having determined from profile data that the UE is dual-connectivity-capable, the MN could trigger and/or engage in a process to establish for the UE a second-RAT air-interface connection between the UE and an SN, so that the MN and SN can then cooperatively provide the UE with dual-connectivity service.

For instance, the MN could direct the UE to scan for secondary coverage under the second RAT, possibly identifying one or more SNs and associated carriers for which the UE should scan, and could receive in response from the UE a report that the UE detected threshold strong coverage of one or more SNs. And the MN could then coordinate setup of dual-connectivity service with the UE being served by the MN and such an SN.

While the specifics of setting up dual-connectivity may vary from implementation to implementation, in an example, the MN could engage in signaling with the SN, with the UE, and with the core-network controller, to coordinate setup of the dual-connectivity service. For instance, the MN could engage in signaling with the UE and with the SN to coordinate setup of a second-RAT connection between the UE and the SN. And the MN could engage in signaling with the core-network controller and/or with the SN to coordinate setup of a split bearer for the UE so that the MN could serve a portion of the UE's data communications and the SN could serve another portion of the UE's data communications.

Further, various split-bearer arrangements may be possible.

In one implementation, the split bearer could be established at the gateway, with one bearer leg extending between the gateway and the MN and another bearer leg extending between the gateway and the SN. For instance, while maintaining the UE's access bearer between the MN and the gateway, the core-network controller could coordinate setup of a secondary access bearer between the SN and the gateway. With this arrangement, communications between the UE and the MN could flow over the access bearer between the MN and the gateway, and communications between the UE and the SN could flow over the access bearer between the SN and the gateway.

In another implementation, the split bearer could be established at the SN, with the UE's access bearer extending between the gateway and the SN and a leg of the bearer extending further between the SN and the MN. For instance, the core-network controller could coordinate transfer of the UE's access bearer from being between the gateway and the MN to instead being between the gateway and the SN, and the MN and SN could coordinate setup of the bearer leg between the MN and the SN. With this arrangement, communications between the SN and the UE would flow over the access bearer between the SN and the gateway, and communications between the MN and the UE would flow between the MN and the SN and likewise over the access bearer between the SN and the gateway.

And in yet another implementation, the split bearer could be established at the MN, with the UE's access bearer still extending between the gateway and the MN, and with a leg of the bearer extending between the MN and the SN. For instance, the MN could maintain the access bearer between the MN and the gateway, and the MN and SN could coordinate setup of the bearer leg between the MN and the SN. With this arrangement, communications between the MN and the UE could flow over the access bearer between the MN and the gateway, and communications between the SN and the UE could flow between the SN and the MN and likewise over the access bearer between the MN and the gateway.

With dual-connectivity service so established through this and/or other steps, the MN and SN could then concurrently serve the UE over their respective connections with the UE, perhaps with both providing for both downlink and uplink downlink scheduled data communication, or perhaps with both providing for downlink scheduled data communication but just the one of the access nodes providing for uplink scheduled data communication.

On the downlink, for instance, when the core network has data destined to the UE, the MN could coordinate downlink transmission of some of the data over the air from the MN to the UE as discussed above, and the SN could coordinate downlink transmission of other of the data over the air from the SN to the UE as discussed above. Likewise, when the UE has data to transmit, the UE could send to the MN a scheduling request for transmission of some of the data to the MN, and the MN could coordinate uplink transmission of that data over the air from the UE to the MN, and the UE could send to the SN a scheduling request for transmission of other of the data to the SN, and the SN could coordinate uplink transmission of that data over the air from the UE to the SN. Or the UE could limit its uplink transmission to just one of the access nodes.

Note also that, with dual connectivity, the UE's power class could define an aggregate maximum transmit power across the UE's two connections, which could be statically or dynamically partitioned between the connections and controlled respectively per connection using a power control process like that noted above.

With static power sharing, for instance, the UE's maximum transmit power as defined by its power class would be statically allocated among the UE's connections, and the power control process would be applied respectively per connection to adjust the UE's transmit power on that connection within the allocated maximum limit. Whereas, with dynamic power sharing, the UE's first-RAT connection could have priority for use of as much of the UE's transmit power as necessary up to the UE's maximum transmit power, with power-control coordinated by the MN, and any remaining power up to the UE's maximum transmit power could be used on the UE's second-RAT connection, with power-control coordinated by the SN.

One technical issue that can arise in configuring dual-connectivity service is that the MN may have a choice of multiple SNs to add for the UE. For instance, when the MN directs the UE to scan for secondary coverage under the second RAT, the UE might discover and report threshold strong coverage of each of multiple candidate SNs. Alternatively, the MN might be pre-provisioned with identifies of the multiple candidate SNs. At issue for the MN in these or other such scenarios is then which SN to select to be used for providing the UE with a second-RAT connection for dual-connectivity service.

The present disclosure provides for basing the selection of SN on a consideration of both (i) the UE's power class and (ii) the quantity of the SN's receive antennas. In particular, the disclosure provides for having the MN or another computing system cooperatively consider both of these factors as a basis to decide which of multiple SNs to select as an SN for use in dual-connectivity service of the UE, and for the MN then accordingly configuring dual-connectivity service for the UE.

This process stems from a realization that, as noted above, a UE's power class and an access node's quantity of receive antennas could each individually impact the uplink receive signal strength of the UE's transmissions. Namely, higher UE power class (e.g., higher aggregate maximum transmit power, with a portion being allocated statically or dynamically for second-RAT transmission) could help to facilitate higher uplink receive signal strength, and a greater number of uplink receive antennas could also help to facilitate higher uplink receive signal strength. Given this, if a UE has a relatively low power class, then it could be beneficial for the UE to be served by an SN that has a greater number of receive antennas, because the greater number of uplink receive antennas may allow the access node obtain higher uplink antenna gain, which could help to compensate for the UE's lower maximum transmit power. Whereas, if the UE has a relatively high power class, then there may be less of a need for increased uplink antenna gain, so it may be suffice for the UE to be served by an SN that has a lesser number of receive antennas.

Accordingly, when an MN faces a choice of multiple SNs to be used for dual-connectivity service of a UE, an example computing system could first determine the UE's power class, and based on the determined power class, the computing system could then select an SN based the quantity of receive antennas the SN has. Here, if the UE has a relatively low power class, then, based on that fact, a basis for the MN's selection of an SN could be that the SN has a relatively large quantity of receive antennas. Whereas, if the UE has a relatively high power class, then, based on that fact, a basis for the MN's selection of an SN could be that the SN has a relatively small quantity of receive antennas.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC). With EN-DC, a 4G access node (4G evolved Node-B (eNB)) typically functions as the MN, and a 5G access node (5G next-generation Node-B (gNB)) typically functions as the secondary access node. Thus, a UE would first establish a standalone-4G connection with a 4G eNB, and the 4G eNB could then coordinate setup of EN-DC service for the UE, including setup for the UE of a secondary 5G connection with a 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
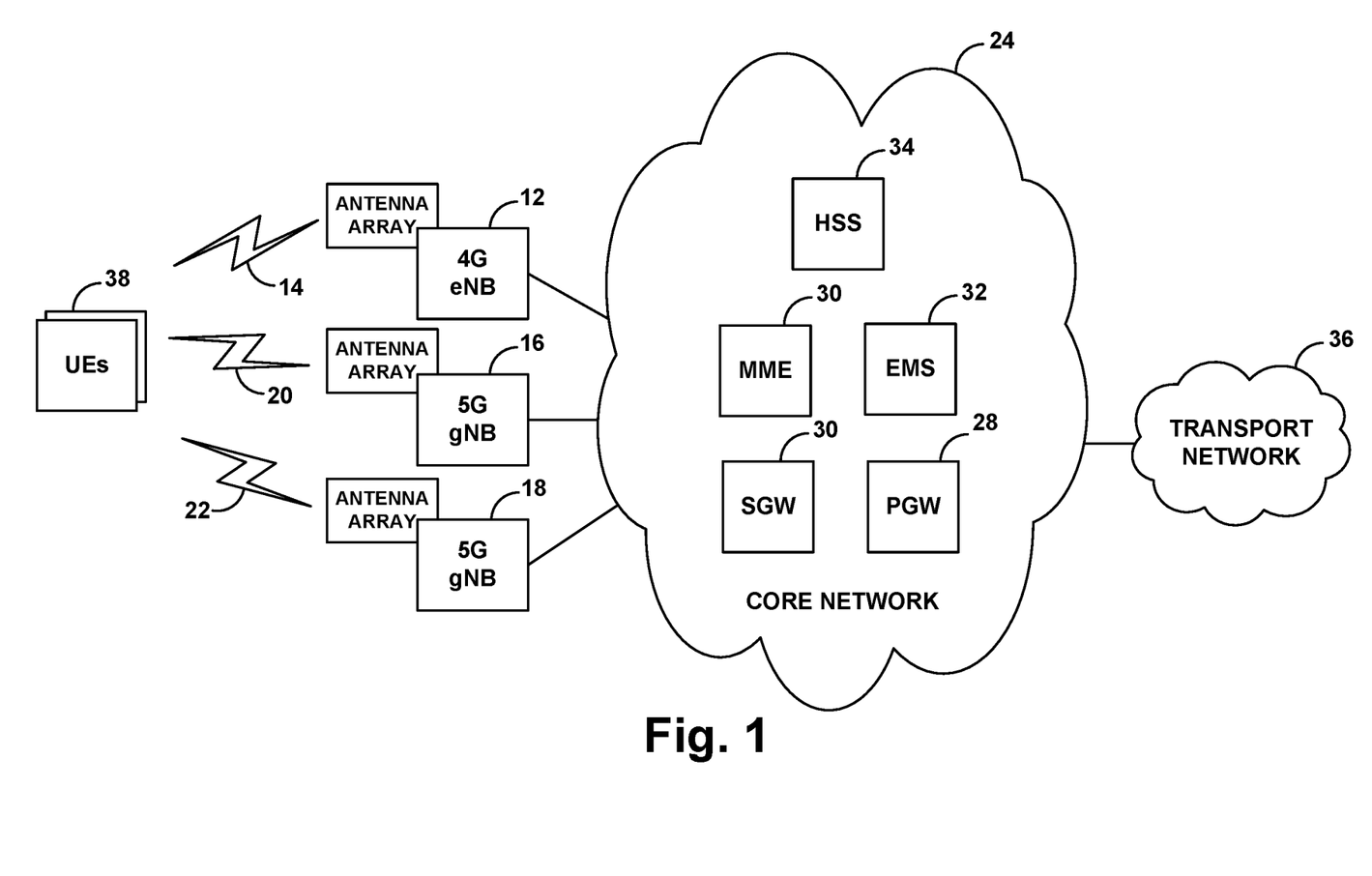
FIG. 1 is a simplified block diagram of an example network arrangement in which features of the present disclosure can be implemented.

FIG. 1 depicts an example network having a 4G eNB 12 that is configured to provide 4G service on a representative 4G carrier 14, and at least two example 5G gNBs 16, 18, configured to provide 5G service on representative 5G carriers 20, 22.

In representative 4G and 5G implementations, each such carrier could be FDD or TDD and could thus define separate downlink and uplink frequency channels or a single frequency channel multiplexed over time between downlink and uplink use. Further, the air interface on each of these carriers could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs.

Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In the arrangement of FIG. 1, each access node could be a macro access node of the type configured to provide a wide range of coverage or could take other forms, such as a small cell access node, a repeater, a femtocell access node, or the like, which might be configured to provide a smaller range of coverage, among other possibilities. Further, the access nodes could be configured to provide overlapping coverage so as to define area in which UEs can engage in both 4G service provided by the 4G eNB 12 and 5G service provided by a 5G gNB 16, 18. And some of the access nodes might be collocated with each other. For instance, a representative cell site might include both a 4G eNB and a 5G gNB.

As further illustrated, each access node in the example network could have an antenna array, which could be configured for use to facilitate wireless transmission and reception, providing respective coverage in which to serve UEs. Such an antenna array could be connected through RF circuitry with a baseband unit of the access node. And the antenna array, and thus the access node, could have a particular number of transmit antennas and a particular number of receive antennas.

Alternatively, multiple access nodes could share a common antenna array, with the antennas being divided among the access nodes for use to facilitate respective transmission and reception. In this case, each access node could have some number of the array's transmit antennas and receive antennas. Without limitation, for example, a cell site that includes both a 4G eNB and a 5G gNB might include a shared antenna array, with half of the array's transmit and receive antennas being connected with a baseband unit of the 4G eNB to facilitate transmission and reception by the 4G eNB, and with the other half of the array's transmit and receive antennas being connected with a baseband unit of the 5G gNB to facilitate transmission and reception by the 5G gNB. Other arrangements are possible as well.

Figure 2:
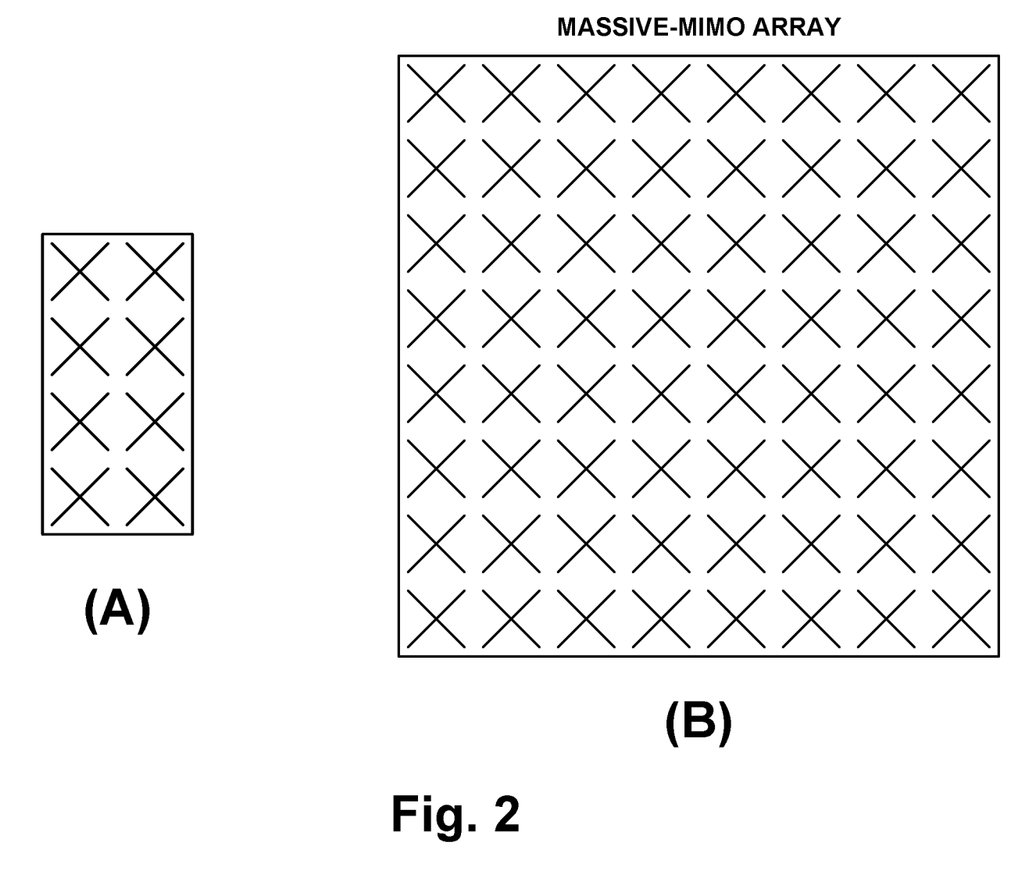
FIG. 2 provides simplified diagrams of example antenna arrays of different sizes.

FIG. 2 depicts two examples of such an antenna array. In FIG. 2, each illustrated X represents two antennas (or antenna elements), one with positive polarization and one with negative polarization. With each such arrangement, some of the antennas might be configured as transmit (downlink) antennas, and others might be configured as receive (uplink) antennas. For instance, all of the antennas with positive polarization might be configured as transmit antennas, and all of the antennas with negative polarization might be configured as receive antennas.

In particular, FIG. 2A illustrates an example antenna array having two columns of antennas with each column including four antennas with positive polarization and four antennas with negative polarization, so that the array might be configured to have 8 transmit antennas and 8 receive antennas. In an example implementation, such an antenna array could be connected and configured for use by a single access node, so that the access node would have 8 transmit antennas and 8 receive antennas. Or in an alternative example implementation, the array could be connected and configured for shared use by two access nodes, such as a 4G eNB and 5G gNB, with each access node having 4 transmit antennas and 4 receive antennas.

Further, FIG. 2B illustrates an example massive-MIMO antenna array having eight columns of antennas with each column including eight antennas with positive polarization and eight antennas with negative polarization, so that the array might be configured to have 64 transmit antennas and 64 receive antennas. In an example implementation, this array could be connected and configured for use by a single access node, so that the access node would have 64 transmit antennas and 64 receive antennas. And in an alternative example implementation, this array could be connected and configured for shared use by two access nodes, such as a 4G eNB and 5G gNB, with each access node having 32 transmit antennas and 32 receive antennas. Other array sizes and configurations are possible as well.

As further shown, the example 4G and 5G access nodes in the example arrangement are each connected with a core network 24, such as an Evolved Packet Core (EPC) network or Next Generation Core (NGC) network. In the example shown, the core network includes a serving gateway (SGW) 26, a packet data network gateway (PGW) 28, a mobility management entity (MME) 30, an element management system (EMS) 32, and a home subscriber server (HSS) 34, although other arrangements are possible as well.

In an example implementation, without limitation, each access node could have an interface with the SGW, the SGW could have an interface with the PGW, and the PGW could provide connectivity with a transport network 36. Further, each access node could have an interface with the MME, and the MME could have an interface with the SGW, so that the MME could coordinate setup of bearers for UEs to enable the UEs to engage in packet-data communication via 4G and 5G. Alternatively, just the 4G eNB might have an interface with the MME and may function as an anchor for signaling with the MME both for 4G service and for 5G and EN-DC service.

Still further, the EMS could operate as a central repository of operational and configuration data for the wireless communication network and to control and manage operation of various network elements. And the HSS could store UE profile records, which could specify service-subscription plans and UE device characteristics, such as whether a UE is EN-DC capable and what the UE's power class is.

FIG. 1 further depicts various example UEs 38 that may from time to time be within coverage of the 4G and 5G access nodes and may from time to time be served by the access nodes. In a representative implementation, each such UE may be 4G and 5G capable, including both a 4G radio and associated equipment and logic that enables the UE to connect with and be served by a 4G eNB, and a 5G radio and associated equipment and logic that enables the UE to connect with and be served by a 5G gNB. Further, each UE may support EN-DC service. And each UE may have a predefined power class that establishes the UE's maximum transmit power, which might be statically or dynamically partitioned between 4G and 5G use as noted above when the UE is served with EN-DC.

In line with the discussion above, upon entering into coverage of the access nodes as shown, a representative such UE 38 could initially scan for 4G coverage and discover threshold strong coverage of 4G eNB 12 on 4G carrier 14. The UE could then engage in RRC signaling with that 4G eNB to establish a 4G connection on the 4G carrier as discussed above. And if appropriate, the UE could engage in attach signaling with the MME through the 4G connection, and the MME could coordinate setup of a bearer for the UE.

In relation to this attachment process, the 4G eNB could also transmit to the UE an RRC message carrying a UE-capability enquiry, and the UE could respond to the 4G eNB with a "UE capability information" information element (IE), which could indicate that the UE is EN-DC capable and could indicate the UE's power class. Alternatively, the 4G eNB could receive such capability information from the MME, which could obtain the information from the HSS. The 4G eNB could then store this UE capability data in a context record for reference while serving the UE.

Further, the 4G eNB could then select a 5G gNB to provide secondary connectivity for the UE, and the 4G eNB could coordinate setup of EN-DC service for the UE, including setup for the UE of a 5G connection with the selected 5G gNB on a 5G carrier, and setup of a split bearer as discussed above. The 4G eNB and 5G gNB could then each serve the UE with packet-data communications over their respective connections with the UE, in the manner discussed above.

In a representative implementation, the 4G eNB could first identify a candidate set of one or more 5G gNBs available for possible use in EN-DC service of the UE. The 4G eNB could be pre-provisioned with data indicating this candidate set, perhaps one or more 5G gNBs known to provide coverage overlapping with that of the 4G eNB. Or the 4G eNB could direct the UE to scan for 5G coverage and could receive in response from the UE a report indicating that the UE has detected threshold strong coverage of each of one or more such 5G gNBs defining the candidate set. In the arrangement of FIG. 1, the candidate set might be 5G gNBs 16 and 18. Or in another arrangement, the candidate set may include one or more other 5G gNBs, perhaps more than two.

As discussed above, the 4G eNB could then select a 5G gNB for use in EN-DC service of the UE, basing the selection on a consideration of cooperatively (i) the UE's power class and (ii) the number of receive antennas of the selected 5G gNB. For instance, the 4G eNB could first determine the UE's power class, by reference to the UE's capability data. And based on the UE's power class, the 4G eNB could then select a 5G gNB based on the number of receive antennas that the 5G gNB has.

For example, if the 4G eNB determines that the UE has a relatively low power class, then, based on that fact, a basis for the 4G eNB's selection of the 5G gNB could be that the 5G gNB has a relatively large quantity of receive antennas. Whereas, if the UE has a relatively high power class, then, based on that fact, a basis for the 4G eNB's selection of the 5G gNB could be that the 5G gNB has a relatively small quantity of receive antennas.

More particularly, the 4G eNB could determine if the UE's power class is at least as low as a predefined threshold low power-class level (e.g., if the UE's power class is 1 or 2, rather than 3 or 4, or the UE's maximum transmit power is 21 dBm or 23 dBm, rather than 26 dBm or 31 dBm).

And if the 4G eNB determines that the UE's power class is at least as low as the threshold low power-class level, then, based at least on that determination, the 4G eNB could base its selection of a 5G gNB on a determination that 5G gNB has more receive antennas than another candidate 5G gNB, and/or on a determination that the 5G gNB has at least a predefined threshold high quantity of receive antennas (e.g., 16, 32, or another such threshold). Whereas if the 4G eNB determines that the UE's power class is not at least as low as the threshold low power-class level, then, based at least on that determination, the 4G eNB might not base its selection of a 5G gNB on the number of receive antennas that the 5G gNB has, or the 4G eNB might base its selection of a 5G gNB on a determination that the 5G gNB has a fewer receive antennas than another candidate 5G gNB and/or on a determination that the 5G gNB has no more than a predefined threshold low quantity of receive antennas (e.g., 4, 8, or another such threshold).

Alternatively, the 4G eNB could determine if the UE's power class is at least as high as a predefined threshold high power-class level (e.g., if the UE's power class is 3 or 4, rather than 1 or 2, or the UE's maximum transmit power is 26 dBm or 31 dBm, rather than 21 dBm or 23 dBm).

And if the 4G eNB determines that the UE's power class is at least as high as the threshold high power-class level, then, based at least on that determination, the 4G eNB could base its selection of a 5G gNB on a determination that 5G gNB has fewer receive antennas than another candidate 5G gNB, and/or on a determination that the 5G gNB has no more than a predefined threshold low quantity of receive antennas (e.g., 4, 8, or another such threshold). Whereas if the 4G eNB determines that the UE's power class is not at least as high as the threshold low power-class level, then, based at least on that determination, the 4G eNB might not base its selection of a 5G gNB on the number of receive antennas that the 5G gNB has, or the 4G eNB might base its selection of a 5G gNB on a determination that the 5G gNB has a more receive antennas than another candidate 5G gNB and/or on a determination that the 5G gNB has at least a predefined threshold high quantity of receive antennas (e.g., 16, 32, or another such threshold).

Note also that the 4G eNB could base this analysis on consideration of any known power split that will exist between the 4G connection and the 5G connection. For instance, with static power sharing where the 4G eNB knows how much of the UE's maximum transmit power would be allocated to the UE's 5G connection, that 5G power allocation could be the point of comparison. If that 5G power allocation would be lower than a given threshold, then the 4G eNB might responsively select a 5G gNB based on it having a relatively great number of receive antennas. Whereas, if that 5G power allocation would be higher than a given threshold, then the 5G eNB might responsively select a 5G gNB based on it having a relatively few number of receive antennas.

Further, note that some or all of process could be carried out instead by another entity, such as by the EMS for instance. For example, when the 4G eNB is going to set up EN-DC for a UE, the 4G eNB could query the EMS, and the EMS could select a 5G gNB based a consideration of UE power class and number of 5G gNB receive antennas and could then respond to the 4G eNB with a directive that causes the 4G eNB to use that selected 5G gNB in EN-DC service of the UE.

Still further, note that the present process could be implemented in the context of identifying one or more candidate 5G gNBs of the set of candidate 5G gNBs in the first place. For instance, given the determined power class of the UE, the 4G eNB or EMS could establish as set of candidate 5G gNBs based on the number of receive antennas of each candidate 5G gNB. By way of example, given a determination that the UE's power class is threshold low, the 4G eNB or EMS could identify the set of candidate 5G gNBs based on each 5G gNB of the set having at least a predefined threshold great number of receive antennas. Further or alternatively, this analysis might form a basis for constructing a measurement object to facilitate UE scanning for 5G coverage to identify one or more candidate 5G gNBs. For instance, given a determination that the UE's power class is threshold low, the 4G eNB could direct to the UE to scan for 5G coverage of one or more 5G gNBs selected based on their having a threshold great number of receive antennas.

And note also that the combined consideration of power class of the UE and number of receive antennas of the 5G gNB could be in addition to consideration of one or more other factors as a basis to select a 5G gNBs to use as an SN for EN-DC service of the UE. The 4G eNB might also take into account other, additional factors, such as reported buffer-occupancy, signal strength, transmission power, and resource usage, among other possibilities.

To facilitate the present process in practice, the 4G eNB, the EMS, or other entity could be provisioned with or otherwise have access to data that indicates, per candidate 5G gNB, the number of receive antennas that the 5G gNB has. This data could be established at the time each 5G gNB is deployed.

The number of receive antennas that a given 5G gNB has could be the number of receive antennas connected for use by the 5G gNB to facilitate receiving UE transmissions, which the 5G gNB might allocate for use as needed. For instance, if the 5G gNB has a dedicated antenna array with a certain number of antennas connected and configured as receive antennas, then the 5G gNB may have that number of receive antennas. Or if the 5G gNB shares an antenna array with another access node and a certain number of the array's antennas are connected and configured as receive antennas for use by the 5G gNB, then the 5G gNB may have that number of receive antennas. Other arrangements may be possible as well, including where a given 5G gNB has multiple sets of receive antennas cooperatively defining a total number of receive antennas of the 5G gNB.

Figure 3:
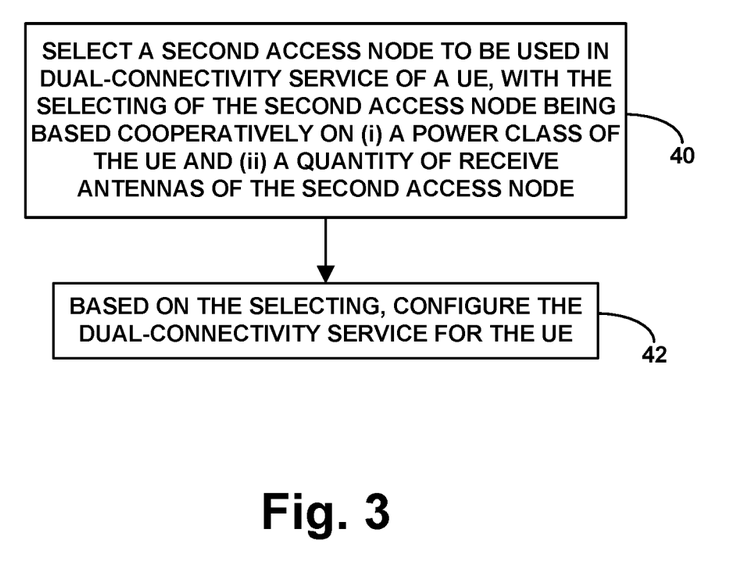
FIG. 3 is a flow chart depicting an example method in accordance with the present disclosure.

FIG. 3 is a flow chart depicting an example method for controlling configuration of dual-connectivity service for a UE, where the dual-connectivity service includes the UE being served concurrently by a first access node over a first connection according to a first RAT and by a second access node over a second connection according to a second RAT. This method could be implemented in a context similar to that discussed above for instance, by or on behalf of the first access node for example. For instance, the method could be carried out at least in part by the first access node and/or by an element management system.

As shown in FIG. 3, at block 40, the method includes selecting the second access node to be used in the dual-connectivity service of the UE, with selecting the second access node being based cooperatively on (i) a power class of the UE, defining a maximum transmit power of the UE, and (ii) a quantity of receive antennas of the second access node. And at block 42, the method includes, based on the selecting, configuring the dual-connectivity service for the UE.

As discussed above the act of selecting the second access node based cooperatively on the power class of the UE and the number of receive antennas of the second access node could take various forms.

For example, it could involve determining that the power class of the UE is at least as low as a predefined threshold low power-class level and, based at least on that determination, (i) basing the selecting of the second access node on a determination that the second access node has more receive antennas than another candidate second access node and/or (ii) basing the selecting of the second access node on a determination that the second access node has at least a predefined threshold high quantity of receive antennas. And as another example, it could involve determining that the power class of the UE is not at least as low as a predefined threshold low power-class level and, based at least on that determination, basing the selecting of the second access node on a determination that the second access node has fewer receive antennas than another candidate second access node.

As yet another example, it could involve determining that the power class of the UE is at least as high as a predefined threshold high power-class level and, based at least on that determination, (i) basing the selecting of the second access node on a determination that the second access node has fewer receive antennas than another candidate second access node and/or (ii) basing the selecting of the second access node on a determination that the second access node no more than a predefined threshold low quantity of receive antennas. And still further, as another example, it could involve determining that the power class of the UE is not at least as high as a predefined threshold high power-class level and, based at least on that determination, basing the selecting of the second access node on a determination that the second access node has more receive antennas than another candidate second access node.

As discussed above, the act of selecting of the second access node based cooperatively on the power class of the UE and the quantity of receive antennas of the second access node can be additionally based on consideration of an uplink power split that will exist between the first connection and the second connection. And the selecting of the second access node could facilitate scanning by the UE for coverage of the second access node to determine whether the second access node should be used in the dual-connectivity service of the UE.

As still further discussed above, the power class of the UE could be defined as the maximum transmit power of the UE, and the number of receive antennas of the second access node could be defined as a total number of antennas connected for use by the second access node to facilitate receiving uplink transmissions (of which the second access node might be able to select one or more antennas for use as needed to receive a given uplink transmission). Further, as discussed above, the act of configuring the dual-connectivity service for the UE based on the selecting could involve engaging in signaling to configure the second connection between the UE and the selected second access node and engaging in signaling to establish for the UE a split bearer so that the first access node and second access node can both serve the UE with data communications.

Figure 4:
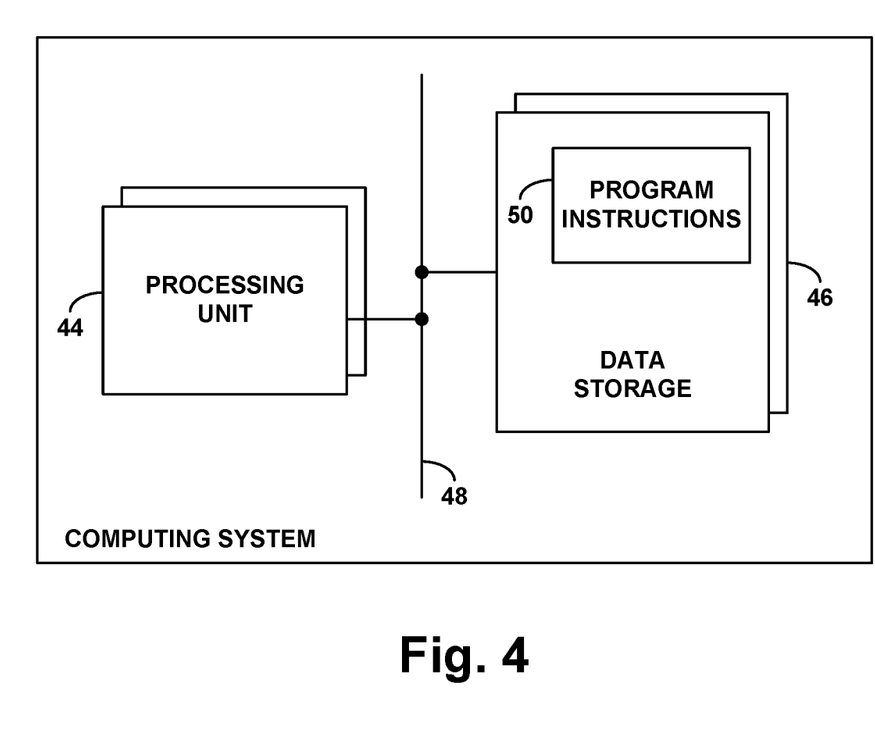
FIG. 4 is a simplified block diagram of a computing system operable in accordance with the disclosure.

FIG. 4 is next a simplified block diagram of a computing system that could carry out various features as described above. As noted above, this computing system could be provided at various entities, such as the first access node or the EMS, among other possibilities. As shown in FIG. 4, the computing system includes at least one processing unit 44 and at least one non-transitory data storage 46, which could be integrated or communicatively linked together by a system bus, network, or other connection mechanism 48.

The at least one processing unit 44 could comprise one or more processors (e.g., one or more general purpose processors and/or specialized processors), such as one or more microprocessors or specialized processors. And the at least one non-transitory data storage 46 could comprise one or more volatile and/or non-volatile storage components, such as magnetic, optical, or flash storage media. An as further shown, the at least one data storage 46 could hold, store, encode, or otherwise embody program instructions 50. In a representative implementation, those program instructions 50 could be executable by the at least one processing unit 44 to carry out various features described herein.

Various other features discussed herein can be implemented in this context as well, and vice versa.

Figure 5:
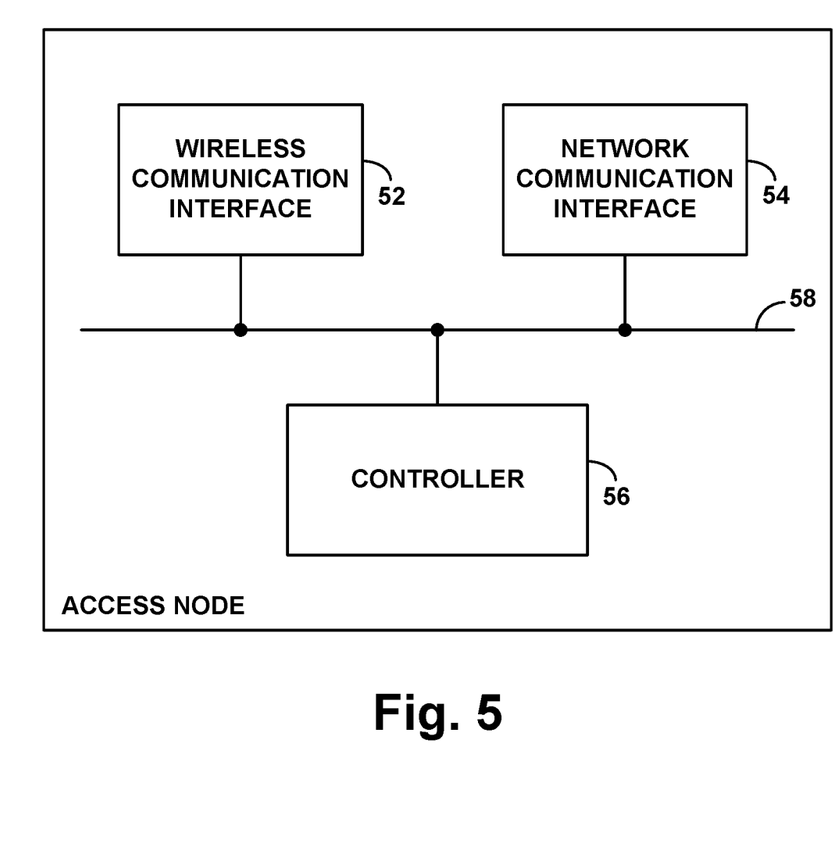
FIG. 5 is a simplified block diagram of an example access node operable in accordance with the present disclosure.

FIG. 5 is next a simplified block diagram depicting an example first access node that could operate in accordance with the present disclosure. As shown, the example first access node includes a wireless communication interface 52, a network communication interface 54, and a controller 56, all of which may be communicatively linked together by a system bus, network, or other connection mechanism 58.

In the context discussed above, this first access node could be configured to engage in air-interface communication and to provide service according to a first RAT through the wireless communication interface 52. Further, the first access node could be provided in a wireless communication system that includes multiple second access nodes each configured to provide service according to a second RAT.

In this example first access node, the wireless communication interface 52 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of user-plane data and control-plane signaling over the air interface in accordance with the first RAT. And the network communication interface 54 could comprise a wired or wireless interface, such as an Ethernet network communication interface, configured to support communication with other entities, such as with the other access node and various core-network entities.

Further, controller 56 could comprise at least one processing (e.g., one or more general purpose processors and/or specialized processors) programmed to cause the first access node to carry out various operations such as those discussed herein. For instance, the controller could comprise non-transitory data storage (e.g., one or more magnetic, optical, or flash storage components) holding program instructions executable by the processing unit to cause the access node to carry out such operations.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Further, although the above description is focused on selecting of a second access node for use in dual-connectivity service of a UE, the disclosure also contemplates using the disclosed principles more generally to facilitate selection of a serving node for a UE, even if not a second access node for dual connectivity. For example, a method and system could be provided for controlling configuration of connectivity for a UE, by carrying out operations including selecting an access node to serve the UE, with selecting of the access node being based cooperatively on (i) a power class of the UE, defining a maximum transmit power of the UE, and (ii) a quantity of receive antennas of the access node.

Exemplary embodiments have been described above. Those skilled in the art will understand, however, that changes and modifications may be made to these embodiments without departing from the true scope and spirit of the invention.

What is claimed is:

1. A method for controlling configuration of dual-connectivity service for a user equipment device (UE), wherein the dual-connectivity service comprises the UE being served concurrently by a first access node over a first connection according to a first radio access technology (RAT) and by a second access node over a second connection according to a second RAT, the method comprising:
   selecting the second access node to be used in the dual-connectivity service of the UE, wherein selecting the second access node is based cooperatively on (i) a power class of the UE, defining a maximum transmit power of the UE, and (ii) a quantity of receive antennas of the second access node; and
   based on the selecting, configuring the dual-connectivity service for the UE,
   wherein selecting the second access node based cooperatively on the power class of the UE and the quantity of receive antennas of the second access node comprises:
     (a) making a first determination selected from the group consisting of (i) that the power class of the UE is at least as low as a predefined threshold low power-class level and (ii) that the power class of the UE is not at least as high as a predefined threshold high power-class level, and
     (b) based at least on the first determination, basing the selecting of the second access node on at least one determination selected from the group consisting of (i) that the second access node has more receive antennas than another candidate second access node and (ii) that the second access node has at least a predefined threshold high quantity of receive antennas.

2. The method of claim 1, wherein selecting the second access node based cooperatively on the power class of the UE and the quantity of receive antennas of the second access node is further based on consideration of an uplink power split that will exist between the first connection and the second connection.

3. The method of claim 1, wherein the selecting of the second access node facilitates scanning by the UE for coverage of the second access node to determine whether the second access node should be used in the dual-connectivity service of the UE.

4. The method of claim 1, wherein the method is carried out at least in part by the first access node.

5. The method of claim 1, wherein the method is carried out at least in part by an element management system.

6. The method of claim 1, wherein the power class of the UE is the maximum transmit power of the UE, and wherein the number of receive antennas of the second access node is a total number of antennas connected for use by the second access node to facilitate receiving uplink transmissions.

7. The method of claim 1, wherein the first RAT is 4G Long Term Evolution (LTE), wherein the second RAT is 5G New Radio (NR), and wherein the dual-connectivity service is EUTRA-NR Dual Connectivity (EN-DC).

8. The method of claim 1, wherein configuring the dual-connectivity service for the UE based on the selecting comprises:
   engaging in signaling to configure the second connection between the UE and the selected second access node; and
   engaging in signaling to establish for the UE a split bearer so that the first access node and second access node can both serve the UE with data communications.

9. A computing system for controlling configuration of dual-connectivity service for a user equipment device (UE), wherein the dual-connectivity service comprises the UE being served concurrently by a first access node over a first connection according to a first radio access technology (RAT) and by a second access node over a second connection according to a second RAT, the computing system comprising:
   at least one processing unit;
   at least one non-transitory data storage; and
   program instructions stored in the at least one non-transitory data storage and executable by the at least one processing unit to carry out operations including selecting the second access node to be used in the dual-connectivity service of the UE, wherein selecting the second access node is based cooperatively on (i) a power class of the UE, defining a maximum transmit power of the UE, and (ii) a quantity of receive antennas of the second access node,
   wherein selecting the second access node based cooperatively on the power class of the UE and the quantity of receive antennas of the second access node comprises:
     (a) making a first determination selected from the group consisting of (i) that the power class of the UE is at least as low as a predefined threshold low power-class level and (ii) that the power class of the UE is not at least as high as a predefined threshold high power-class level, and
     (b) based at least on the first determination, basing the selecting of the second access node on at least one determination selected from the group consisting of (i) that the second access node has more receive antennas than another candidate second access node and (ii) that the second access node has at least a predefined threshold high quantity of receive antennas.

10. The computing system of claim 9, wherein selecting the second access node based cooperatively on the power class of the UE and the quantity of receive antennas of the second access node is further based on consideration of an uplink power split that will exist between the first connection and the second connection.

11. The computing system of claim 9, wherein the selecting of the second access node facilitates scanning by the UE for coverage of the second access node to determine whether the second access node should be used in the dual-connectivity service of the UE.

12. The computing system of claim 9, wherein the power class of the UE is the maximum transmit power of the UE, and wherein the number of receive antennas of the second access node is a total number of antennas connected for use by the second access node to facilitate receiving uplink transmissions.

13. The computing system of claim 9, wherein the first RAT is 4G Long Term Evolution (LTE), wherein the second RAT is 5G New Radio (NR), and wherein the dual-connectivity service is EUTRA-NR Dual Connectivity (EN-DC).

14. In a wireless communication system comprising a first access node configured to provide service according to a first radio access technology (RAT) and a plurality of second access nodes each configured to provide service according to a second RAT, the first access node comprising:

a wireless communication interface through which to engage in air-interface communication and provide the service according to the first RAT; and a controller, wherein the controller is configured to cause the first access node to carry out operations when a user equipment device (UE) has a first connection with the first access node according to the first RAT, the operations including:

selecting one of second access nodes from among the plurality of second access nodes, the selecting being based cooperatively on (i) a power class of the UE and (ii) a quantity of receive antennas of the second access node, and based on the selecting, configuring the dual-connectivity service for the UE, with the UE having the first connection with the first access node and having a second connection with the selected second access node, wherein selecting the second access node based cooperatively on the power class of the UE and the quantity of receive antennas of the second access node comprises:

(a) making a first determination selected from the group consisting of (i) that the power class of the UE is at least as low as a predefined threshold low power-class level and (ii) that the power class of the UE is not at least as high as a predefined threshold high power-class level, and (b) based at least on the first determination, basing the selecting of the second access node on at least one determination selected from the group consisting of (i) that the second access node has more receive antennas than another candidate second access node and (ii) that the second access node has at least a predefined threshold high quantity of receive antennas.

15. The first access node of claim 14, wherein selecting the second access node based cooperatively on the power class of the UE and the quantity of receive antennas of the second access node is further based on consideration of an uplink power split that will exist between the first connection and the second connection.

16. The first access node of claim 14, wherein the selecting of the second access node facilitates scanning by the UE for coverage of the second access node to determine whether the second access node should be used in the dual-connectivity service of the UE.

17. The first access node of claim 14, wherein the power class of the UE is the maximum transmit power of the UE, and wherein the number of receive antennas of the second access node is a total number of antennas connected for use by the second access node to facilitate receiving uplink transmissions.

18. The first access node of claim 14, wherein the first RAT is 4G Long Term Evolution (LTE), wherein the second RAT is 5G New Radio (NR), and wherein the dual-connectivity service is EUTRA-NR Dual Connectivity (EN-DC).

19. The first access node of claim 14, wherein configuring the dual-connectivity service for the UE based on the selecting comprises:

engaging in signaling to configure the second connection between the UE and the selected second access node; and engaging in signaling to establish for the UE a split bearer so that the first access node and second access node can both serve the UE with data communications.

* * * * *